United States Patent
Oh

(10) Patent No.: US 10,152,066 B2
(45) Date of Patent: Dec. 11, 2018

(54) WATER STORAGE TANK AND METHOD FOR CONTROLLING FULL WATER LEVEL THEREOF

(71) Applicant: COWAY CO., LTD., Chungcheongnam-do (KR)

(72) Inventor: Jung-Hwan Oh, Seoul (KR)

(73) Assignee: Coway Co., Ltd (KR)

( * ) Notice: Subject to any disclaimer, the term of this patent is extended or adjusted under 35 U.S.C. 154(b) by 33 days.

(21) Appl. No.: 15/300,593

(22) PCT Filed: Mar. 17, 2015

(86) PCT No.: PCT/KR2015/002585
§ 371 (c)(1),
(2) Date: Sep. 29, 2016

(87) PCT Pub. No.: WO2015/156512
PCT Pub. Date: Oct. 15, 2015

(65) Prior Publication Data
US 2017/0177010 A1 Jun. 22, 2017

(30) Foreign Application Priority Data

Apr. 11, 2014 (KR) .................. 10-2014-0043780
Nov. 26, 2014 (KR) .................. 10-2014-0166752

(51) Int. Cl.
*G05D 9/12* (2006.01)
*B01D 21/00* (2006.01)
(Continued)

(52) U.S. Cl.
CPC ........... *G05D 9/12* (2013.01); *B01D 21/0012* (2013.01); *C02F 1/008* (2013.01); *C02F 2209/40* (2013.01);
(Continued)

(58) Field of Classification Search
CPC .................. G05D 9/12; B01D 21/0012; Y10T 137/8342; Y10T 137/7758–137/777;
(Continued)

(56) References Cited

U.S. PATENT DOCUMENTS 2,246,563 A * 6/1941 Winters ............... G01F 23/247
122/451.1
4,521,312 A * 6/1985 Anderson .......... B01D 17/0214
210/119
(Continued)

FOREIGN PATENT DOCUMENTS

CN 2616577 5/2004
CN 1595322 3/2005
(Continued)

OTHER PUBLICATIONS

Chinese Office Action dated Mar. 5, 2018 issued in counterpart application No. 201580019056.4, 6 pages.
(Continued)

*Primary Examiner* — Craig J Price
(74) *Attorney, Agent, or Firm* — The Farrell Law Firm, P.C.

(57) ABSTRACT

Disclosed are a water storage tank and a method for controlling the full water level thereof. The water storage tank according to one embodiment of the present invention comprises: a tank main body for storing water which flows in through a water inlet and discharging water through an outlet; and a control unit for controlling inflow and outflow of water into and from the tank main body, wherein the control unit can change the height of the full water level of the tank main body according to a user's selection or the degree of water discharge from the tank main body.

4 Claims, 9 Drawing Sheets

(51) Int. Cl.
*G01F 23/24* (2006.01)
*C02F 1/00* (2006.01)

(52) U.S. Cl.
CPC ...... *C02F 2209/42* (2013.01); *C02F 2307/10* (2013.01); *G01F 23/247* (2013.01); *G01F 23/248* (2013.01); *Y10T 137/0324* (2015.04); *Y10T 137/7306* (2015.04)

(58) Field of Classification Search
CPC ......... Y10T 137/7306; Y10T 137/7287; Y10T 137/0324; Y10T 137/7303; Y10T 137/731; A01K 7/00; A01K 7/02; A01K 7/005; A01K 5/02; A01K 5/029; A01K 39/02; A01K 39/04; G01F 23/241; G01F 23/242; G01F 23/246; G01F 23/247; G01F 23/282; G01F 23/205; G01F 23/185; C02F 2307/10; C02F 2209/40; C02F 2209/42; C02F 1/008
USPC ................ 137/386–392, 395, 1, 2, 11, 558; 73/290 R, 304 R, 304 C; 116/227–229
See application file for complete search history.

(56) References Cited

U.S. PATENT DOCUMENTS

| | | | | |
|---|---|---|---|---|
| 5,671,603 A * | 9/1997 | McCorkle | ............ | F17C 13/021 137/392 |
| 5,705,747 A * | 1/1998 | Bailey | ................ | G01F 23/0069 340/525 |
| 5,932,022 A | 8/1999 | Linn et al. | | |
| 6,026,837 A * | 2/2000 | Chen | ........................ | G05D 9/12 137/2 |
| 6,575,010 B2 * | 6/2003 | Colman | ............. | G01F 23/0046 702/59 |
| 6,688,329 B2 * | 2/2004 | Murray | ..................... | G05D 9/12 116/109 |
| 6,988,406 B1 * | 1/2006 | MacK | ..................... | G01F 23/02 73/305 |
| 7,477,950 B2 * | 1/2009 | DeBourke | ............... | E03C 1/041 700/19 |
| 8,387,630 B2 * | 3/2013 | Yamamoto | .......... | H01L 21/6715 134/104.2 |
| 8,801,276 B2 * | 8/2014 | Al-Misfer | ............... | G01F 23/22 374/112 |
| 9,066,496 B2 * | 6/2015 | Hymes | ..................... | A01K 7/02 |
| 9,097,388 B2 * | 8/2015 | Mariserla | .................. | F17D 1/00 |
| 9,170,030 B2 * | 10/2015 | Nagata | .................... | F24D 3/082 |
| 9,752,569 B1 * | 9/2017 | Morris | .................. | F04B 49/065 |
| 9,772,210 B1 * | 9/2017 | Houghton | ............... | G01F 23/22 |
| 2002/0078995 A1 * | 6/2002 | Kramer | ................. | F16K 11/022 137/386 |
| 2008/0163416 A1 * | 7/2008 | Go | .......................... | E03C 1/055 4/559 |
| 2009/0229683 A1 * | 9/2009 | Baek | ..................... | G01F 23/263 137/386 |
| 2012/0035880 A1 * | 2/2012 | Al-Misfer | ............... | G01F 23/22 702/130 |
| 2013/0160862 A1 * | 6/2013 | Yang | .................... | G01F 25/0061 137/2 |
| 2015/0208609 A1 * | 7/2015 | Tillet | ....................... | A01K 7/02 119/74 |
| 2015/0323938 A1 * | 11/2015 | Levy | ...................... | G01F 23/247 137/2 |
| 2016/0291609 A1 * | 10/2016 | Lucas | ...................... | C09K 8/62 |

FOREIGN PATENT DOCUMENTS

| | | |
|---|---|---|
| CN | 2903757 | 5/2007 |
| CN | 204098146 | 1/2015 |
| CN | 105091973 | 11/2015 |
| JP | 2011-163298 | 8/2011 |
| KR | 1019990012482 | 2/1999 |
| KR | 1019990012483 | 2/1999 |
| KR | 1999-0083075 | 11/1999 |
| KR | 1020020090940 | 12/2002 |
| KR | 1020060118654 | 11/2006 |
| KR | 1020130003201 | 1/2013 |

OTHER PUBLICATIONS

Korean Office Action dated Jul. 17, 2018 issued in counterpart application No. 10-2014-0166752, 4 pages.

* cited by examiner

【Figure 1】
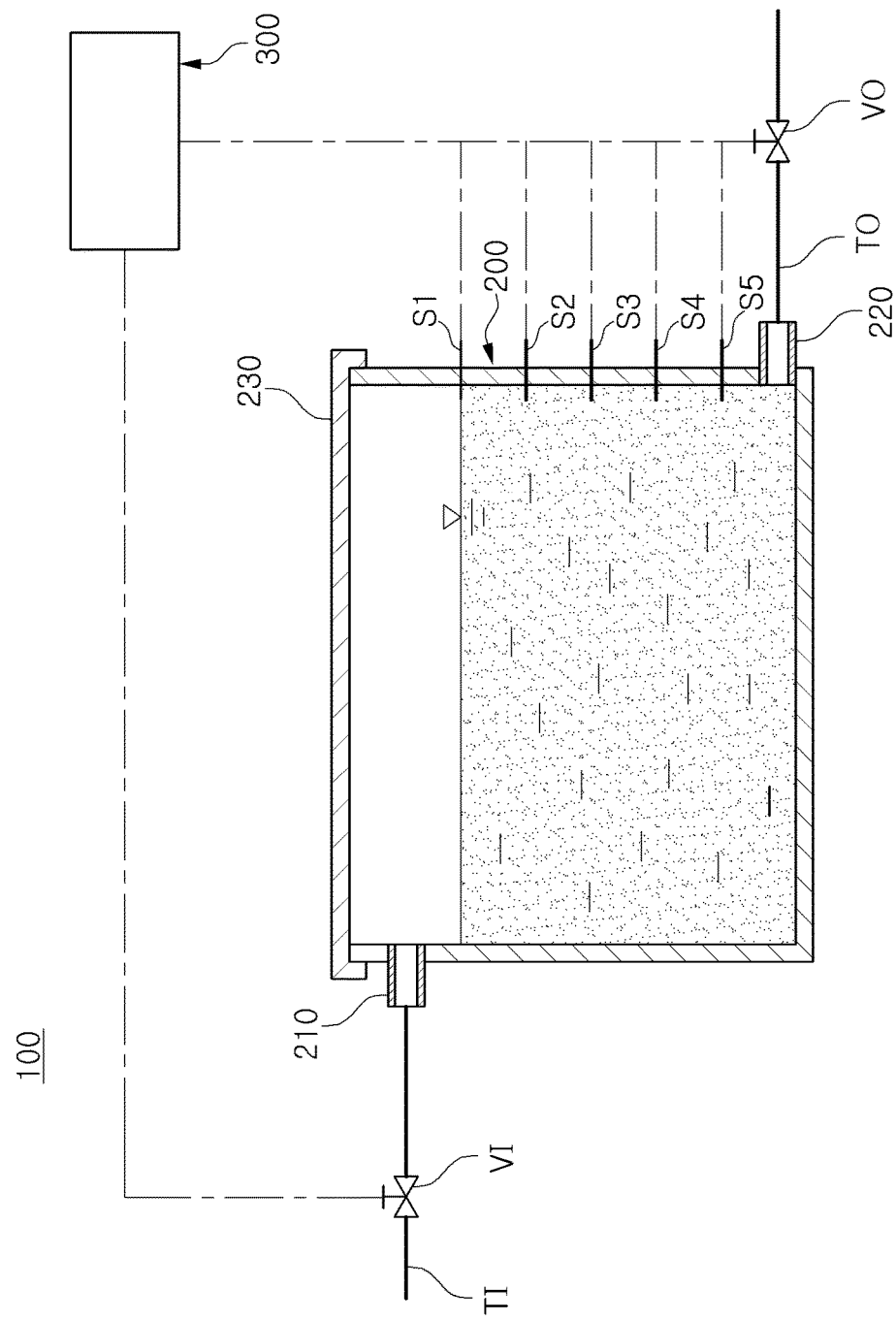

[Figure 2]
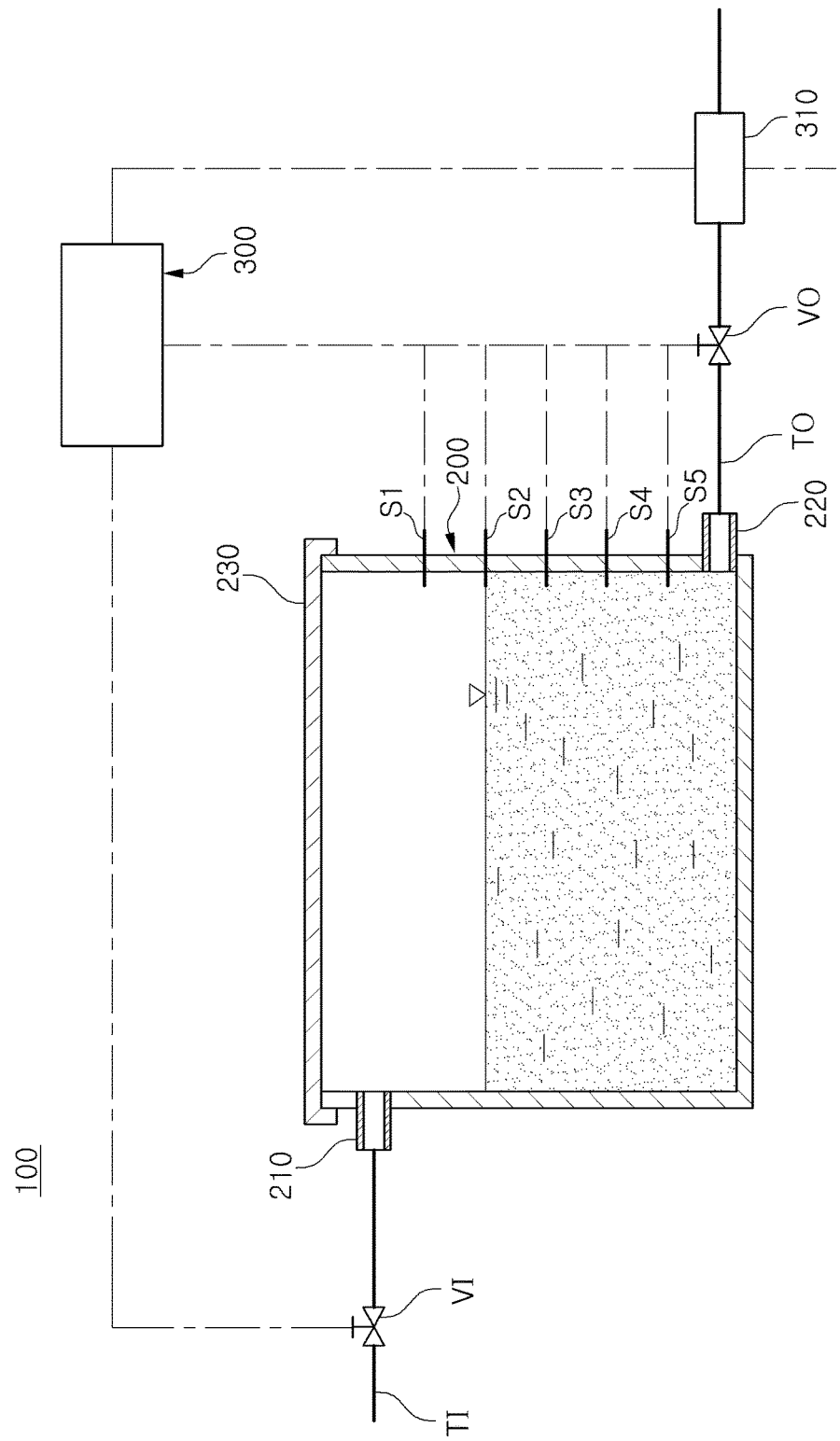

【Figure 3】
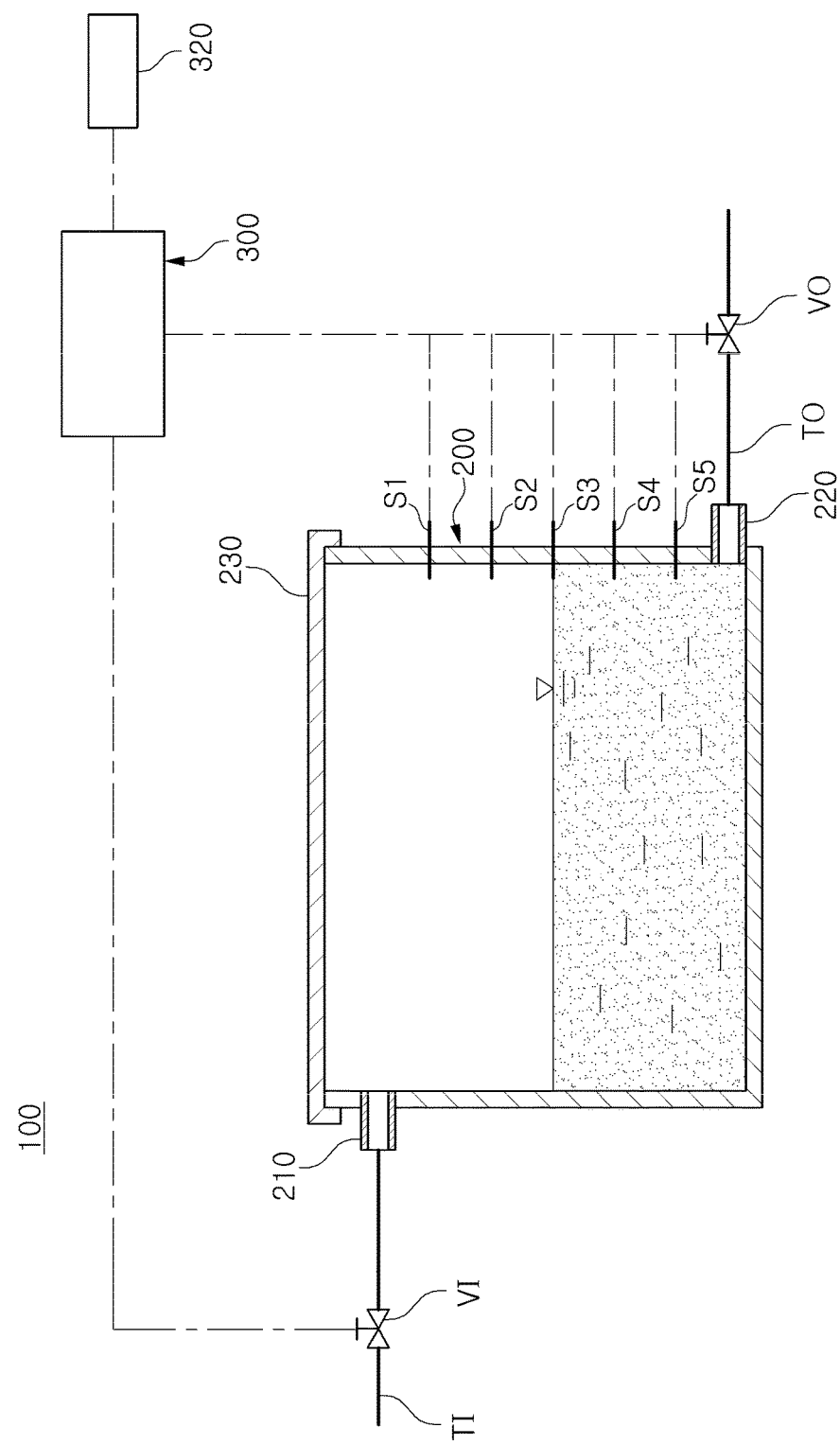

[Figure 4]
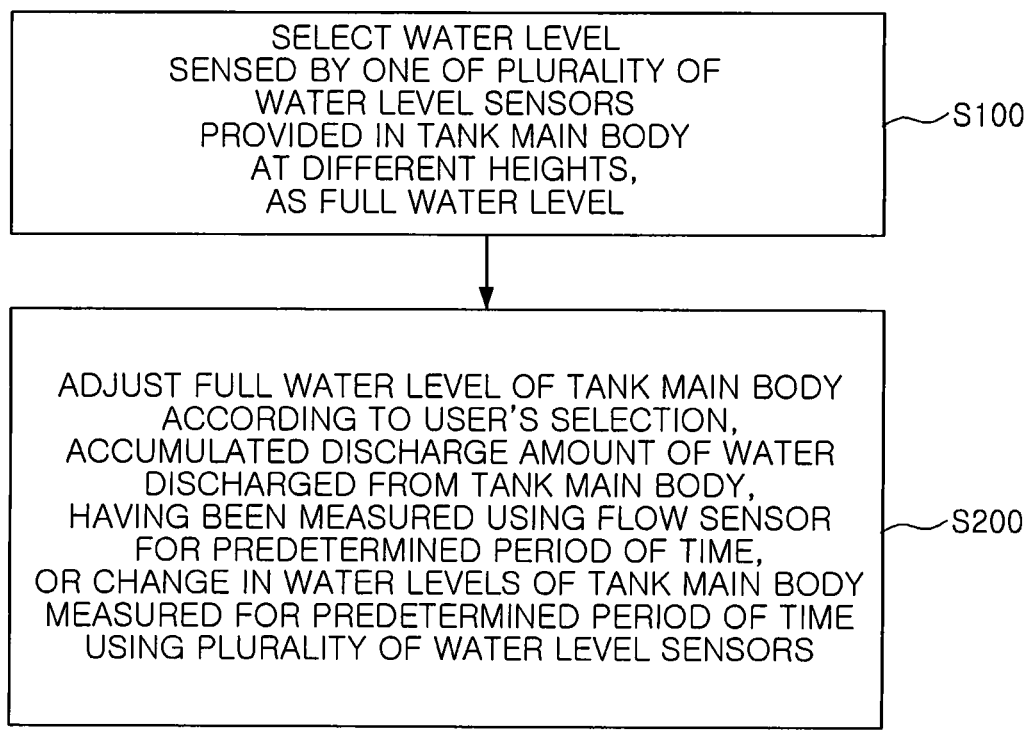

[Figure 5]
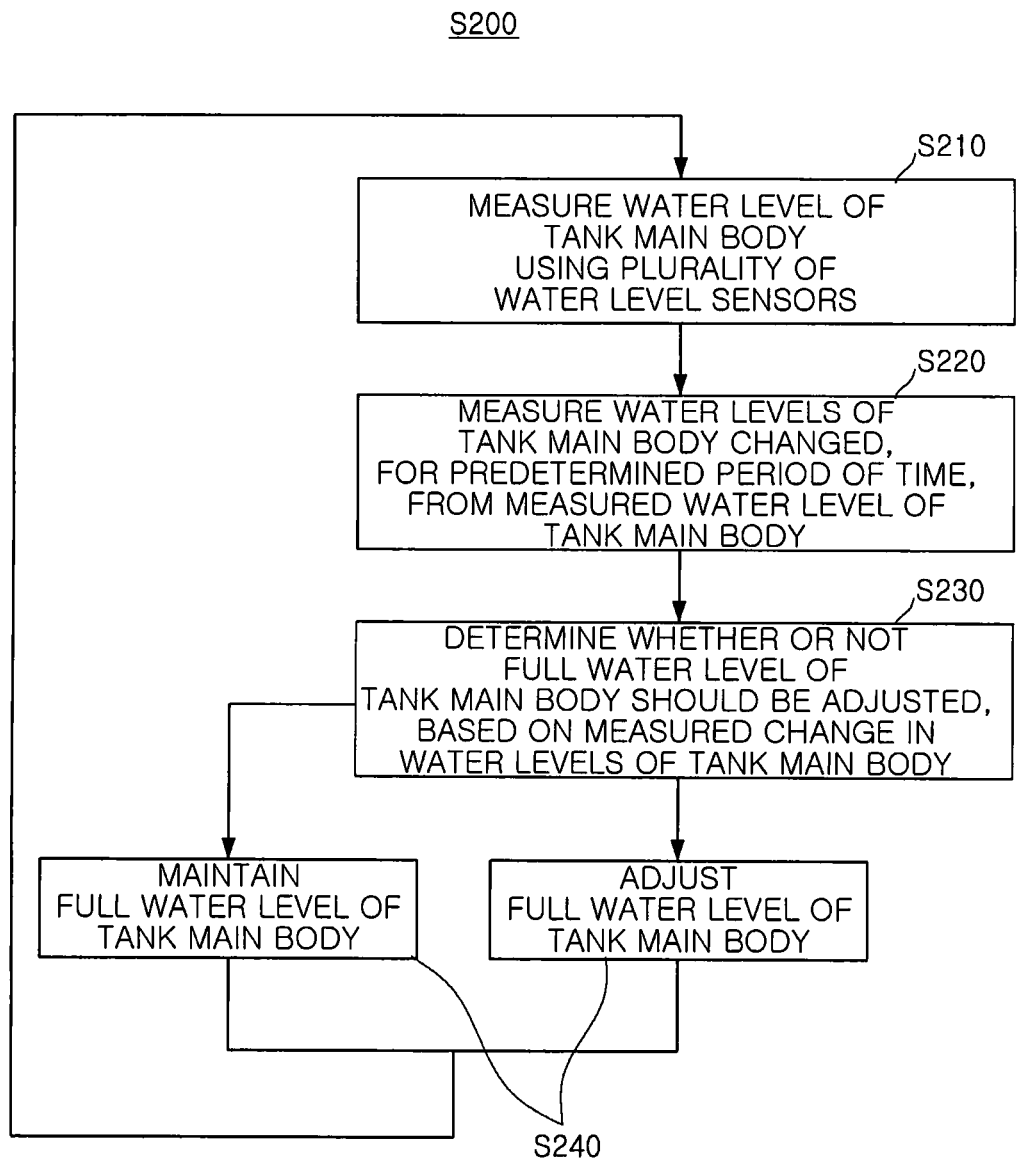

【Figure 6】
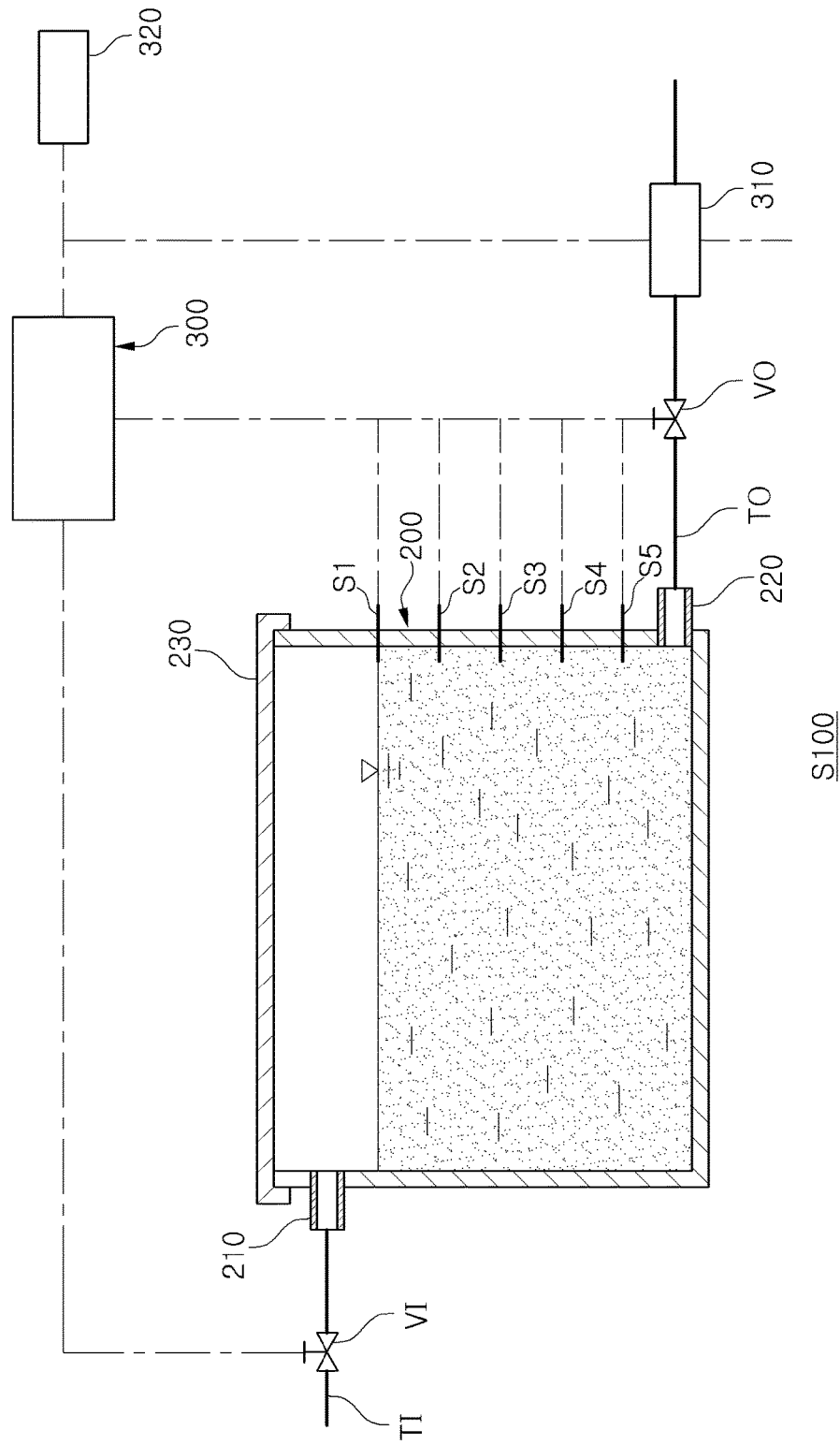

【Figure 7】
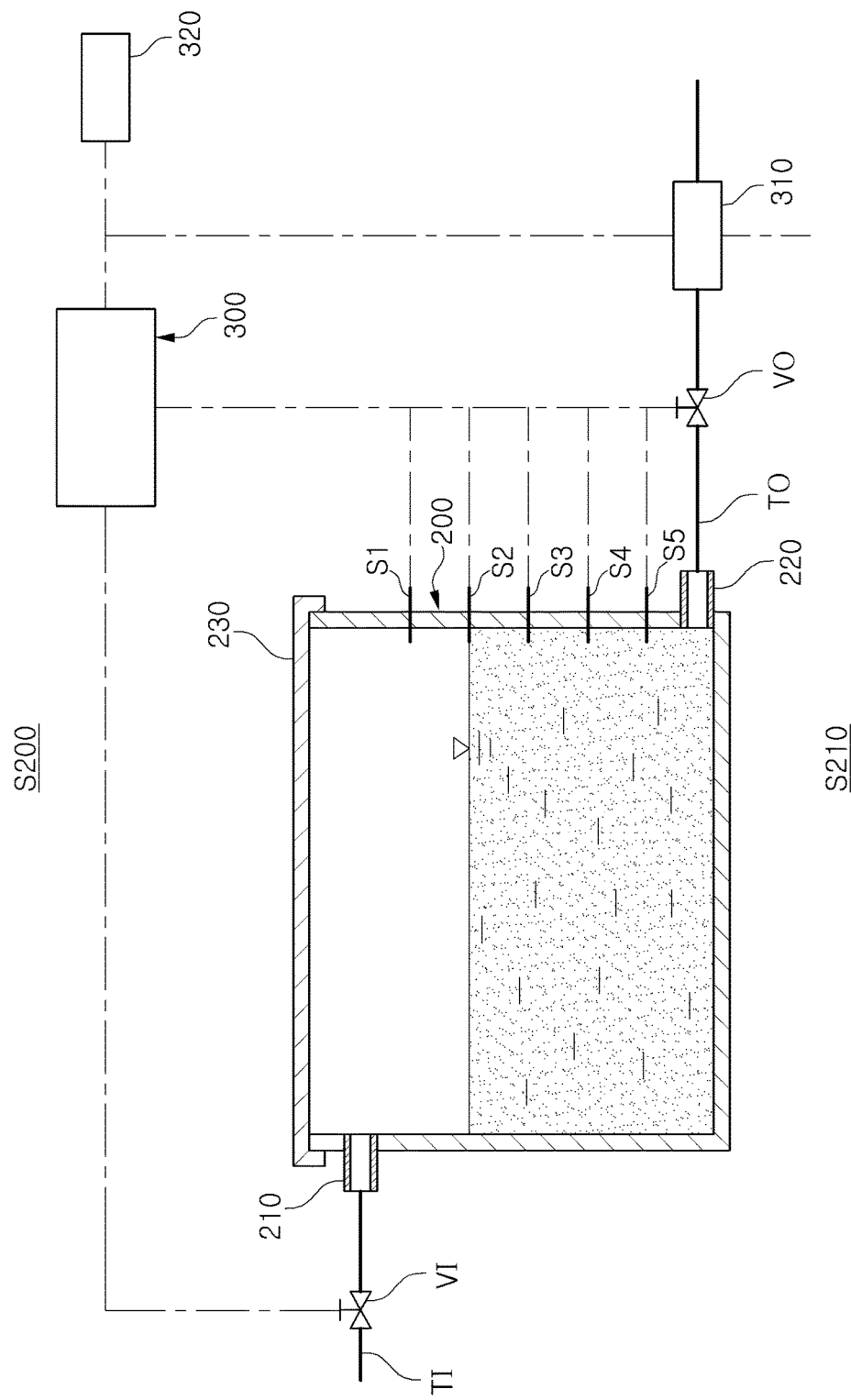

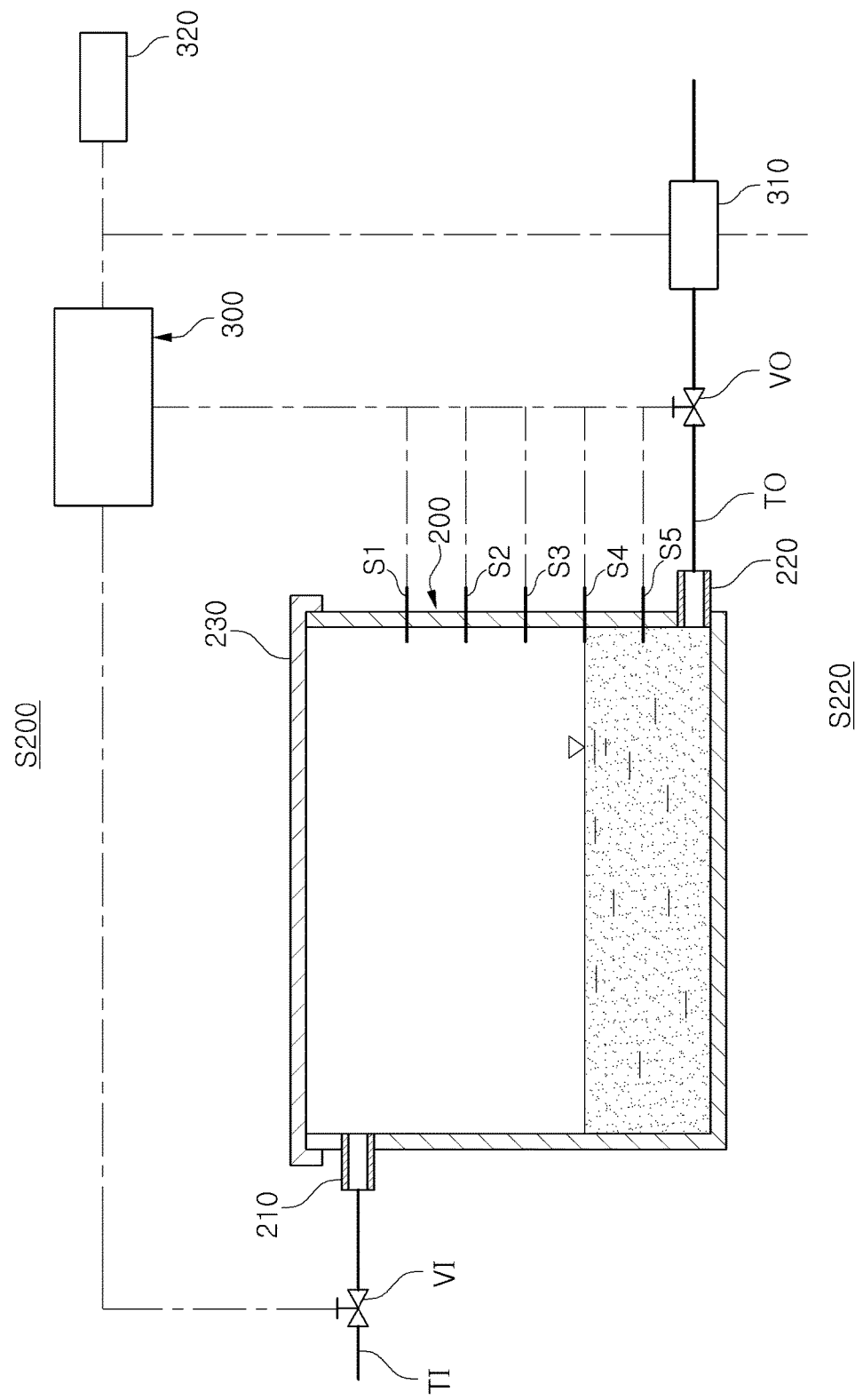
[Figure 8]

【Figure 9】
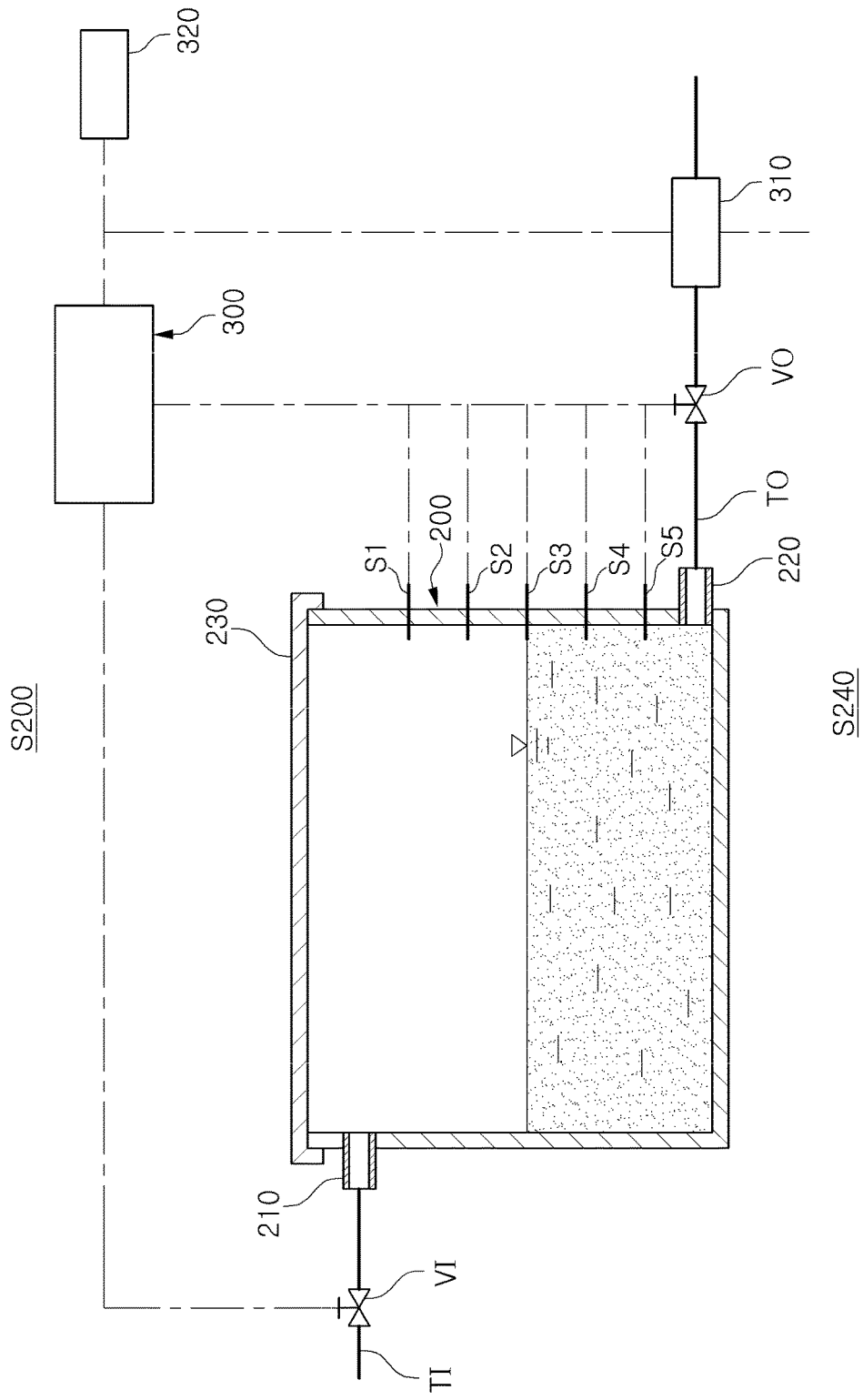

WATER STORAGE TANK AND METHOD FOR CONTROLLING FULL WATER LEVEL THEREOF

PRIORITY

This application is a National Phase Entry of PCT International Application No. PCT/KR2015/002585, which was filed on Mar. 17, 2015, and claims priority to Korean Patent Application No. 10-2014-0043780, which was filed on Apr. 11, 2014, and to Korean Patent Application No. 10-2014-0166752, which was filed on Nov. 26, 2014, the contents of each of which are incorporated herein by reference.

TECHNICAL FIELD

The present disclosure relates to a water storage tank and a method for controlling a full water level thereof. More particularly, the present disclosure relates to a water storage tank in which a full water level is changed according to a water discharge amount or user selection, and a method for controlling a full water level thereof.

BACKGROUND ART

Water storage tanks store water supplied by water supply sources therein and allow stored water to be discharged externally.

Such water storage tanks may be provided with water treatment devices, such as water purifiers and the like. Treated water, filtered by water filters or the like, may be stored in water storage tanks.

On the other hand, such water storage tanks may be set to maintain a predetermined full water level. Thus, when the water level in such a water storage tank is below full, water may flow into the water storage tank to maintain the full level.

In the case that water, treated by a water filter or the like, is stored in a water storage tank, if the usage amount of water is relatively low, for example, if the amount of water discharged from the water storage tank is low, water may remain in the water storage tank for a relatively long period of time.

Thus, even in the case that the water has been treated by the water filter or the like, bacteria may grow and multiply therein. In other words, the sanitary conditions of the water storage tank may be reduced. Furthermore, since water containing a proliferation of bacteria may be supplied to a user, the user may be exposed to microbiological risks.

Therefore, a water storage tank capable of preventing the growth of bacteria is required.

DISCLOSURE

Technical Problem

The present disclosure is provided to address at least one requirement or problem occurring in the related art.

An aspect of the present disclosure is to provide a water storage tank in which a full water level may be changed according to a water discharge amount or by user selection, and a method for controlling a full water level thereof.

Another aspect of the present disclosure is to provide a water storage tank in which water may be prevented from remaining for a relatively long period of time, and a method for controlling a full water level thereof.

Another aspect of the present disclosure is to provide a water storage tank capable of supplying clean water to a user while having improved sanitary conditions, and a method for controlling a full water level thereof.

Technical Solution

A water storage tank according to an aspect of the present disclosure provides the following characteristics.

According to an aspect of the present disclosure, a water storage tank includes: a tank main body into which water flows through an inlet to be stored therein and from which water is discharged through an outlet; and a control unit controlling a flow of water into and from the tank main body, wherein the control unit controls a full water level height of the tank main body to be changed according to an amount of water discharged from the tank main body or user selection.

In the tank main body, a plurality of water level sensors may be provided at different heights, and the control unit may use one of the plurality of water level sensors as a full water level sensor according to the amount of water discharged from the tank main body.

The control unit may measure the amount of water discharged from the tank main body using a degree of reduction of a water level of the tank main body.

The control unit may measure the degree of reduction of a water level of the tank main body using the plurality of water level sensors.

The control unit may include a flow sensor measuring an amount of water discharged from the tank main body to measure the amount of water discharged from the tank main body.

In the tank main body, a plurality of water level sensors may be provided at different heights, and the control unit may include an input portion capable of receiving a command from a user, to use one of the plurality of water level sensors as a full water level sensor according to user selection via the input portion.

According to an aspect of the present disclosure, a method for controlling a full water level of a water storage tank includes: a full water level selection operation of selecting, as a full water level, a water level sensed by one of a plurality of water level sensors provided in a tank main body at different heights; and a full water level adjusting operation of adjusting a full water level of the tank main body according to user selection, an accumulated amount of water discharged from the tank main body, having been measured using a flow sensor for a predetermined period of time, or a change in water levels of the tank main body measured for a predetermined period of time using the plurality of water level sensors.

In the full water level selection operation, a full water level may be selected by user selection or an initial setting.

In the full water level adjusting operation, a water level corresponding to the accumulated amount of water discharged from the tank main body, having been measured using the flow sensor, among water levels of the tank main body sensed by the respective water level sensors, may be used as a full water level.

The full water level adjusting operation may include: a water level measurement operation of measuring a water level of the tank main body using the plurality of water level sensors; a water level change measurement operation of measuring water levels of the tank main body changed, for a predetermined period of time, from the water level of the tank main body having been measured in the water level measurement operation; a full water level adjustment determining operation of determining whether or not a full water level of the tank main body should be adjusted, based on the change in water levels of the tank main body having been measured in the water level change measurement operation; and a full water level adjusting operation of maintaining or adjusting a full water level of the tank main body according to a determination in the full water level adjustment determining operation.

In the water level change measurement operation, water may be prevented from flowing into the tank main body.

In the full water level adjustment determining operation, whether or not a full water level of the tank main body should be adjusted may be determined by comparing a water level change degree of the tank main body measured in the water level change measurement operation to a water level change degree with respect to water levels of the tank main body sensed by the respective water level sensors.

Advantageous Effects

As set forth above, according to exemplary embodiments in the present disclosure, a full water level height of a water storage tank may be set to be changed according to a water discharge amount or user selection.

In addition, according to an exemplary embodiment in the present disclosure, water may be prevented from remaining in a water storage tank for a relatively long period of time and bacterial growth in the water storage tank may be prevented.

Furthermore, according to an exemplary embodiment in the present disclosure, the sanitary conditions of a water storage tank may be improved and relatively clean water may be supplied to users.

DESCRIPTION OF DRAWINGS

FIG. 1 illustrates a water storage tank according to an exemplary embodiment in the present disclosure.

FIG. 2 illustrates a water storage tank according to another exemplary embodiment in the present disclosure.

FIG. 3 illustrates a water storage tank according to another exemplary embodiment in the present disclosure.

FIGS. 4 to 9 are drawings illustrating a method of controlling a full water level of a water storage tank according to an exemplary embodiment in the present disclosure.

MODE FOR INVENTION

Hereinafter, a water storage tank according to an exemplary embodiment in the present disclosure will be described in detail, to provide an understanding of characteristics according to exemplary embodiments in the present disclosure.

Exemplary embodiments of the present disclosure will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Exemplary Embodiment of Water Storage Tank

Hereinafter, a water storage tank according to an exemplary embodiment in the present disclosure will be described with reference to FIG. 1.

FIG. 1 illustrates a water storage tank according to an exemplary embodiment in the present disclosure.

A water storage tank according to an exemplary embodiment may include a tank main body 200 and a control unit 300.

The tank main body 200 may include an inlet 210 and an outlet 220. Water may flow through the inlet 210 to be stored in the tank main body 200, and water stored in the tank main body 200 may be discharged through the outlet 220.

The inlet 210 may be connected to a water supply source (not shown) via an inflow water pipe TI. In addition, an inflow water valve VI may be provided on the inflow water pipe TI. Thus, for example, when the inflow water valve VI is opened, water from the water supply source may flow into the tank main body 200 through the inlet 210 and may be stored therein.

The outlet 220 may be connected to a discharge pipe TO. In addition, a discharge valve VO may be provided on the discharge pipe TO. Thus, for example, when the discharge valve VO is opened, water stored in the tank main body 200 may be discharged through the outlet 220.

An upper portion of the tank main body 200 may be open, and the open upper portion of the tank main body 200 may be opened or closed by a cover member 230. However, the configuration of the tank main body 200 is not particularly limited, and any configuration in the art in which water may flow in and then be discharged may be employed.

The control unit 300 may control an inflow of water into or an outflow of water from the tank main body 200. To this end, the control unit 300 may be electrically connected to the inflow water valve VI and the outflow valve VO. In addition, by opening or closing the inflow water valve VI and the discharge valve VO, the flow of water into or from the tank main body 200 may be controlled.

For example, by opening the discharge valve VO by the control unit 300, the water in the tank main body 200 may be discharged externally. In addition, for example, when a water level of the tank main body 200 does not satisfy a predetermined, required water level, for example, is below full water level, the control unit 300 may control the inflow water valve VI to be opened and thus allow the water to flow into the tank main body 200.

In addition, the control unit 300 may control a full water level height of the tank main body 200 to allow the full water level to be changed according to an amount of water discharged from the tank main body 200.

Thus, since the full water level height of the water storage tank 100 is changed, the water in the water storage tank 100 may be prevented from remaining for a relatively long period of time. Further, since bacteria may be prevented from growing and multiplying in water stored in the water storage tank 100, the sanitary conditions of the water storage tank 100 may be improved and relatively clean water may be supplied to users.

To this end, a plurality of water level sensors S1, S2, S3, S4, and S5 may be provided in the tank main body 200 at different heights. In the exemplary embodiment of FIG. 1, five water level sensors S1, S2, S3, S4, and S5 are provided at different heights. However, the number of the water level sensors S1, S2, S3, S4, and S5 is not particularly limited, and any number greater than one may be employed.

The control unit 300 may use one of the plurality of water level sensors S1, S2, S3, S4, and S5, as a full water level sensor, according to an amount of water discharged from the tank main body 200.

For example, when the water discharge amount is significantly high, an uppermost water level sensor, for example, a first water level sensor S1, among the plurality of water level sensors S1, S2, S3, S4, and S5 located on the tank main body 200, may be used as a full water level sensor. Thus, the control unit 300 may control the flow of water from or into the tank main body 200, such that a water level of the tank main body 200 may be maintained at a height of the first water level sensor S1.

For example, when the water discharge amount is significantly low, a lowermost water level sensor, for example, a fifth water level sensor S5, among the plurality of water level sensors S1, S2, S3, S4, and S5, may be used as a full water level sensor. Thus, the control unit 300 may control the flow of water from or into the tank main body 200, such that a water level of the tank main body 200 may be maintained at a height of the fifth water level sensor S5.

In addition, the control unit 300 may use the second to fourth water level sensors S2 to S4, as full water level sensors, according to amounts of water discharged, to control the flow of water from or into the tank main body 200.

The control unit 300 may measure an amount of water discharged from the tank main body 200, using a degree of reduction of a water level of the tank main body 200. To this end, the control unit 300 may measure the degree of reduction of a water level of the tank main body 200 using the plurality of water level sensors S1, S2, S3, S4, and S5.

For example, when a water level of the tank main body 200 is lowered from the first water level sensor S1 to the fifth water level sensor S5 for a predetermined unit time, the control unit 300 may determine that the water discharge amount is significantly high, and may thus use the first water level sensor S1 as a full water level sensor. Thus, the control unit 300 may control the flow of water from or into the tank main body 200, such that the water level of the tank main body 200 may be maintained at a height of the first water level sensor S1, as illustrated in FIG. 1.

In addition, for example, when for a predetermined unit time, a water level of the tank main body 200 is lowered from the first water level sensor S1 to the second water level sensor S2, from the second water level sensor S2 to the third water level sensor S3, from the third water level sensor S3 to the fourth water level sensor S4, or from the fourth water level sensor S4 to the fifth water level sensor S5, the control unit 300 may determine that the water discharge amount is relatively low, and may thus use the fourth water level sensor S4 as a full water level sensor.

In this case, the control unit 300 may control the flow of water from or into the tank main body 200, such that a water level of the tank main body 200 may be maintained at a height of the fourth water level sensor S4.

In addition, for example, when for a predetermined unit time, a water level of the tank main body 200 is lowered from the first water level sensor S1 to the third water level sensor S3, from the second water level sensor S2 to the fourth water level sensor S4, or from the third water level sensor S3 to the fifth water level sensor S5, the control unit 300 may determine that the water discharge amount is appropriate, and may use the third water level sensor S3 as a full water level sensor.

Further, the control unit 300 may control the flow of water from or into the tank main body 200, such that a water level of the tank main body 200 may be maintained at a height of the third water level sensor S3.

In addition, for example, when for a predetermined unit time, a water level of the tank main body 200 is lowered from the first water level sensor S1 to the fourth water level sensor S4 or from the second water level sensor S2 to the fifth water level sensor S5, the control unit 300 may determine that the water discharge amount is relatively high, and may thus use the second water level sensor S2 as a full water level sensor.

Further, the control unit 300 may control the flow of water from or into the tank main body 200, such that a water level of the tank main body 200 may be maintained at a height of the second water level sensor S2.

Another Exemplary Embodiment of Water Storage Tank

Hereinafter, a water storage tank according to another exemplary embodiment in the present disclosure will be described with reference to FIG. 2.

FIG. 2 illustrates a water storage tank according to another exemplary embodiment in the present disclosure.

A water storage tank according to an exemplary embodiment with reference to FIG. 2 has a difference from the water storage tank 100 described above with reference to FIG. 1, in that an amount of water discharged from a tank main body 200 is measured using a flow sensor 310.

Thus, only a difference therebetween will be described below, and a description of configurations overlapping with those of the foregoing exemplary embodiment will be substituted with the description above with reference to FIG. 1.

A control unit 300 of a water storage tank 100 according to another exemplary embodiment in the present disclosure may include the flow sensor 310. The flow sensor 310 may be provided on a discharge pipe TO as illustrated in FIG. 2.

A position of the flow sensor 310 is not particularly limited, and any location thereof in which an amount of water discharged from the tank main body 200 may be measured may be applied thereto.

In addition, a configuration of the flow sensor 310 is not particularly limited, and any configuration in the art in which a flow amount of water may be measured may be employed.

The control unit 300 may recognize a flow amount of water discharged from the tank main body 200 using the flow sensor 310. In addition, for example, when an accumulated amount of water discharged from the tank main body 200, having been measured by the flow sensor 310 for a predetermined unit time, is significantly high, the first water level sensor S1 may be used as a full water level sensor.

In addition, for example, when the accumulated water discharge amount measured for a predetermined unit time is significantly low, the fifth water level sensor S5 may be used as a full water level sensor. In addition, for example, when the accumulated water discharge amount measured for a predetermined unit time is relatively high or relatively low, the second water level sensor S2 or the fourth water level sensor S4 may be used as a full water level sensor. In addition, for example, when the accumulated water discharge amount measured for a predetermined unit time is appropriate, the third water level sensor S3 may be used as a full water level sensor.

Further, the control unit 300 may control a flow of water from or into the tank main body 200, such that a water level of the tank main body 200 may be maintained at a height of the water level sensor S1, S2, S3, S4, or S5 having been used as a full water level sensor.

For example, when since the accumulated water discharge amount measured for a predetermined unit time is relatively high, the second water level sensor S2 is used as a full water level sensor as illustrated in FIG. 2, the control unit 300 may control the flow of water from or into the tank main body 200, such that a water level of the tank main body 200 may be maintained at a height of the second water level sensor S2.

Another Exemplary Embodiment of Water Storage Tank

Hereinafter, a water storage tank according to another exemplary embodiment in the present disclosure will be described with reference to FIG. 3.

FIG. 3 illustrates a water storage tank according to another exemplary embodiment in the present disclosure.

A water storage tank according to an exemplary embodiment with reference to FIG. 3 has a difference from the water storage tank 100 described above with reference to FIG. 1, in that a control unit 300 includes an input portion 320.

Thus, differences therebetween will be principally described below, and a description of configurations overlapping with those of the foregoing exemplary embodiment will be substituted with the description above with reference to FIG. 1.

The control unit 300 of a water storage tank 100 according to another exemplary embodiment may include the input portion 320. The control unit 300 may receive a command from a user through the input portion 320. The input portion 320 may be a dial, a plurality of buttons, a touchscreen, or the like.

However, the configuration of the input portion 320 is not particularly limited, and any configuration in the art, capable of receiving a command from a user may be employed.

A user may select a full water level height of the water storage tank 100 appropriate for a current usage amount of water. Further, the control unit 300 may use a water level sensor S1, S2, S3, S4, or S5 corresponding to user selection, as a full water level sensor.

For example, in the input unit 320, a water consumption amount is classified as one of five stages, "Very high", "Relatively high", "Suitable", "Relatively low", and "Very low". For example, when a user selects "Very high", the control unit 300 may use the first water level sensor S1 as a full water level sensor, and when selecting "Relatively high", the control unit 300 may use the second water level sensor S2 as a full water level sensor. Further, when a user selects "Suitable", the control unit 300 may use the third water level sensor S3 as a full water level sensor, and when selecting "Relatively low", the control unit 300 may use the fourth water level sensor S4 as a full water level sensor. When a user selects "Very low", the control unit 300 may use the fifth water level sensor S5 as a full water level sensor.

Further, the control unit 300 may control a flow of water from or into the tank main body 200, such that a water level of the tank main body 200 may be maintained at a height of the water level sensor S1, S2, S3, S4, or S5 having been selected as a full water level sensor.

For example, when the third water level sensor S3 is used as a full water level sensor by selecting "appropriate" by a user as illustrated in FIG. 3, the control unit 300 may control the flow of water from or into the tank main body 200, such that a water level of the tank main body 200 may be maintained at a height of the third water level sensor S3.

Method for Controlling Full Water Level of Water Storage Tank

Hereinafter, a method for controlling a full water level of a water storage tank according to an exemplary embodiment in the present disclosure will be described with reference to FIGS. 4 to 9.

A method for controlling a full water level of a water storage tank according to an exemplary embodiment may include a full water level selection operation S100 and a full water level adjusting operation S200.

In the full water level selection operation S100, a water level sensed by one of a plurality of water level sensors S1, S2, S3, S4, and S5 provided in a tank main body 200 of a water storage tank 100 at different heights may be selected as a full water level of the tank main body 200.

In the full water level selection operation S100, a full water level may be selected by user selection or an initial setting.

A user may select a water level sensed by one of the plurality of water level sensors S1, S2, S3, S4, and S5 provided in the tank main body 200 at different heights, as a full water level, using the input portion 320 described above.

As such, when the water level sensed by any one water level sensor is selected as a full water level by the user, the control unit 300 may use the water level sensor sensing a water level selected by the user, as a full water level sensor.

In addition, a water level sensed by one of the plurality of water level sensors S1, S2, S3, S4, and S5 provided in the tank main body 200 at different heights may be selected as a full water level by an initial setting operation.

As such, when the water level sensed by any one water level sensor is selected as a full water level by the initial setting, the control unit 300 may use the water level sensor sensing a water level selected by the initial setting, as a full water level sensor.

For example, a water level sensed by a first water level sensor S1 may be selected as a full water level by user selection using the input portion 320 or the initial setting operation. Thus, the control unit 300 may use the first water level sensor S1 as a full water level sensor, and as illustrated in FIG. 6, the tank main body 200 of the water storage tank 100 may always be filled with water to a water level sensed by the first water level sensor S1.

In the full water level adjusting operation S200, the full water level of the tank main body 200 selected in the full water level selection operation S100 may be adjusted.

In the full water level adjusting operation S200, the full water level of the tank main body 200 may be adjusted by user selection. A user may adjust the full water level to a water level different from the water level having been selected as a full water level in the full water level selection operation S100.

As such, when the full water level has been adjusted to a water level different from the water level having been selected as a full water level in the full water level selection operation S100 by the user, the control unit 300 may use a water level sensor sensing a water level selected as a full water level by the user, as a full water level sensor.

For example, with respect to the water level sensed by the first water level sensor S1, which has been selected as a full water level in the full water level selection operation S100, a user may adjust a water level sensed by a third water level sensor S3 to a full water level using the input portion 320.

Thus, the control unit 300 may use the third water level sensor S3 as a full water level sensor, and as illustrated in FIG. 9, the tank main body 200 of the water storage tank 100 may be always filled with water to a water level sensed by the third water level sensor S3.

On the other hand, in the full water level adjusting operation S200, a full water level may be adjusted according to an accumulated amount of water discharged from the tank main body 200, measured for a predetermined period of time using the flow sensor 310. For example, when the accumulated amount of water discharged from the tank main body 200, measured for a predetermined period of time using the flow sensor 310, does not satisfy a water level having been selected as a full water level in the full water level selection operation S100, the control unit 300 may adjust the full water level to a water level corresponding thereto.

For example, when the accumulated amount of water discharged from the tank main body 200 does not satisfy a water level sensed by the first water level sensor S1, having been selected in the full water selection operation S100, but satisfies a water level sensed by the third water level sensor S3, the control unit 300 may use the third water level sensor S3 as a full water level sensor.

Thus, as illustrated in FIG. 9, the tank main body 200 of the water storage tank 100 may be always filled with water to a water level sensed by the third water level sensor S3.

On the other hand, in the full water level adjusting operation S200, a full water level of the tank main body 200 may be adjusted according to a change in water levels of the tank main body 200 measured for a predetermined period of time using the plurality of water level sensors S1, S2, S3, S4, and S5.

To this end, as illustrated in FIG. 5, the full water level adjusting operation S200 may include a water level measurement operation S210, a water level change measurement operation S220, a full water level adjustment determining operation S230, and a full water level adjusting operation S240.

In the water level measurement operation S210, a water level of the tank main body 200 may be measured using the plurality of water level sensors S1, S2, S3, S4, and S5. For example, when a water level of the tank main body 200 corresponds to a water level sensed by the second water level sensor S2 as illustrated in FIG. 7, the water level may be sensed by the second water level sensor S2 and the sensed information may be transferred to the control unit 300.

In the water level change measurement operation S220, water levels of the tank main body 200 changed, for a predetermined period of time, from the water level of the tank main body 200 having been measured in the water level measurement operation S210 may be measured.

For example, when a water level of the tank main body 200 is lowered from a water level sensed by the second water level sensor S2 to a water level sensed by the fourth water level sensor S4 due to water consumption as illustrated in FIG. 8, a reduction in the water level may be sensed by the fourth water level sensor S4 and transferred to the control unit 300. Further, the control unit 300 may store information that the water level of the tank main body 200 has been changed from a water level of the second water level sensor S2 to that of the fourth water level sensor S4 therein.

In the water level change measurement operation S220, water may not flow into the tank main body 200. Thus, in the water level change measurement operation S220, a water level change of the tank main body 200 according to the use of water, for example, a change in a water level formed by the discharge of water from the tank main body 200 may only be measured. To this end, the control unit 300 may allow an inflow water valve VI provided on an inflow water pipe TI to be closed.

In the full water level adjustment determining operation S230, whether or not a full water level of the tank main body 200 will be adjusted may be determined, based on the change in water levels of the tank main body 200 having been measured in the water level change measurement operation S220.

To this end, the full water level adjustment determining operation S230, whether or not a full water level of the tank main body 200 will be adjusted may be determined, by comparing a water level change level of the tank main body 200 measured in the water level change measurement operation S220 to a water level change level with respect to water levels of the tank main body 200 sensed by the respective water level sensors.

For example, as described above, when it is measured that the water level of the tank main body 200 has been changed from a water level of the second water level sensor S2 to that of the fourth water level sensor S4 in the water level change measurement operation S220, and this water level change degree corresponds to a water level change degree corresponding to a water level corresponding to a water level sensed by the third water level sensor S3, rather than corresponding to a water level sensed by the first water level sensor S1, the control unit 300 may determine that the full water level needs to be adjusted.

In the full water level adjusting operation S240, a full water level of the tank main body 200 may be maintained or adjusted according to a determination in the full water level adjustment determining operation S230.

For example, when the control unit 300 determines that the full water level needs to be maintained in the full water level adjustment determining operation S230, the control unit 300 may maintain the full water level in the full water level adjusting operation S240. For example, the control unit 300 may not change a water level sensor used as a full water level sensor.

In addition, when the control unit 300 determines that the full water level needs to be adjusted in the full water level adjustment determining operation S230, the control unit 300 may adjust the full water level in the full water level adjusting operation S240.

For example, as described above, when it is determined that the full water level needs to be adjusted in the full water level adjustment determining operation S230, the control unit 300 may use the third water level sensor as a full water level sensor.

Thus, as illustrated in FIG. 9, the tank main body 200 of the water storage tank 100 may be always filled with water to a water level sensed by the third water level sensor S3.

As described above, by using a water storage tank according to an exemplary embodiment in the present disclosure and a method for controlling a full water level thereof, a full water level height of a water storage tank may be set to be changed according to a water discharge amount or user selection. In addition, water may be prevented from remaining in a water storage tank for a relatively long period of time and thus, bacterial growth in the water storage tank may be prevented. Furthermore, the sanitary conditions of a water storage tank may be improved and clean water may be supplied to users.

The configuration of a water storage tank described as above according to exemplary embodiments is not limited to the description above. The entirety or a portion of the respective exemplary embodiments in the present disclosure described above may be selectively combined and configured to be modified.

The invention claimed is:

1. A water storage tank comprising:
   a tank main body into which water flows through an inlet to be stored in the tank main body and from which water is discharged through an outlet; and
   a control unit controlling a flow of water into and from the tank main body,
   wherein the control unit controls a full water level height of the tank main body to be changed according to an amount of water discharged from the tank main body,
   wherein in the tank main body, a plurality of water level sensors are provided at different heights, and the control unit uses one of the plurality of water level sensors as a full water level sensor according to the amount of water discharged from the tank main body,
   wherein the control unit measures the amount of water discharged from the tank main body using a degree of reduction of a water level of the tank main body, and
   wherein the control unit measures the degree of reduction of a water level of the tank main body using the plurality of water level sensors.

2. A method for controlling a full water level of a water storage tank, comprising:
   a full water level selection operation of selecting, as a full water level, a water level sensed by one of a plurality of water level sensors provided in a tank main body at different heights; and
   a full water level adjusting operation of adjusting a full water level of the tank main body according to a change in water levels of the tank main body measured for a predetermined period of time using the plurality of water level sensors,
   wherein the full water level adjusting operation comprises a water level measurement operation of measuring a water level of the tank main body using the plurality of water level sensors, a water level change measurement operation of measuring water levels of the tank main body changed, for a predetermined period of time, from the water level of the tank main body having been measured in the water level measurement operation, and a full water level adjustment determining operation of determining whether or not a full water level of the tank main body should be adjusted, based on the change in water levels of the tank main body having been measured in the water level change measurement operation, and
   wherein the full water level adjusting operation maintains or adjusts a full water level of the tank main body according to a determination in the full water level adjustment determining operation.

3. The method of claim 2, wherein in the water level change measurement operation, water is prevented from flowing into the tank main body.

4. The method of claim 2, wherein in the full water level adjustment determining operation, whether or not a full water level of the tank main body should be adjusted is determined by comparing a water level change degree of the tank main body measured in the water level change measurement operation to a water level change degree with respect to water levels of the tank main body sensed by the respective water level sensors.

* * * * *